United States Patent
Osborne

(10) Patent No.: US 9,558,437 B2
(45) Date of Patent: Jan. 31, 2017

(54) SYSTEMS FOR AND METHODS OF COMMUNICATING BARCODE INFORMATION TO POINT-OF-SALE TERMINAL

(71) Applicant: Mobeam, Inc., Palo Alto, CA (US)

(72) Inventor: John Osborne, Incline Village, NV (US)

(73) Assignee: Mobeam, Inc., Palo Alto, CA (US)

( * ) Notice: Subject to any disclaimer, the term of this patent is extended or adjusted under 35 U.S.C. 154(b) by 0 days.

(21) Appl. No.: 14/479,347

(22) Filed: Sep. 7, 2014

(65) Prior Publication Data

US 2015/0186765 A1 Jul. 2, 2015

Related U.S. Application Data

(60) Provisional application No. 61/921,049, filed on Dec. 26, 2013.

(51) Int. Cl.
| | |
|---|---|
| *G06K 19/00* | (2006.01) |
| *G06K 19/06* | (2006.01) |
| *G06Q 30/00* | (2012.01) |
| *G06K 19/07* | (2006.01) |
| *G07C 11/00* | (2006.01) |

(52) U.S. Cl.
CPC ..... *G06K 19/06112* (2013.01); *G06K 19/0728* (2013.01); *G06Q 30/00* (2013.01); *G07C 11/00* (2013.01)

(58) Field of Classification Search
USPC ................ 235/435, 439, 451, 462
See application file for complete search history.

(56) References Cited

U.S. PATENT DOCUMENTS

| | | |
|---|---|---|
| 6,685,093 B2 | 2/2004 | Challa et al. |
| 6,877,665 B2 | 4/2005 | Challa et al. |
| 7,028,906 B2 | 4/2006 | Challa et al. |
| 7,231,025 B2 | 6/2007 | Labaton |
| 7,243,233 B2 | 7/2007 | Kindberg et al. |
| 7,322,863 B2 | 1/2008 | Rapp |
| 7,395,961 B2 | 7/2008 | Challa et al. |
| 7,509,119 B2 | 3/2009 | Eonnet |
| 7,857,225 B2 | 12/2010 | Challa et al. |
| 7,967,211 B2 | 6/2011 | Challa et al. |
| 8,132,012 B2 | 3/2012 | Labaton |

(Continued)

OTHER PUBLICATIONS

International Search Report and Written Opinion, issued in connection with Int'l application No. PCT/US14/070150, dated Apr. 3, 2015, pp. 1-7.

*Primary Examiner* — Matthew Mikels
(74) *Attorney, Agent, or Firm* — Westberg Law Offices

(57) ABSTRACT

A method of communicating barcode information using audio signaling is disclosed. A mobile device being brought into physical proximity to a communication bridge device is detected. Two-way audio communication is commenced between the mobile device and the bridge device upon detection of the mobile device by the bridge device. Barcode information is communicated from the mobile device to the bridge device. The barcode information is converted into a pulsed signal to simulate scanning of a static image of a barcode. A human perceptible signal is provided that indicates the barcode information has been received into the bridge device. The barcode information is transmitted as light pulses emitted from the bridge device for reception by a barcode scanner.

30 Claims, 17 Drawing Sheets

(56) References Cited

U.S. PATENT DOCUMENTS

| | | |
|---|---|---|
| 8,447,668 B2 | 5/2013 | Jentoft |
| 2002/0126780 A1 | 9/2002 | Oshima et al. |
| 2007/0083439 A1 | 4/2007 | Petrovich |
| 2008/0149721 A1* | 6/2008 | Shadwell ......... G06K 19/06206 235/462.01 |
| 2009/0267895 A1 | 10/2009 | Bunch |
| 2010/0048242 A1 | 2/2010 | Rhoads et al. |
| 2010/0188254 A1 | 7/2010 | Johnson et al. |
| 2010/0243732 A1 | 9/2010 | Wallner |
| 2011/0305207 A1* | 12/2011 | Konetski ................. H04R 3/12 370/329 |
| 2012/0147867 A1* | 6/2012 | Kale ................... H04L 65/4061 370/338 |
| 2012/0313900 A1 | 12/2012 | Dahl |
| 2013/0171930 A1 | 7/2013 | Anand et al. |
| 2013/0218701 A1 | 8/2013 | Challa et al. |
| 2013/0268277 A1 | 10/2013 | Duplan |
| 2013/0275305 A1 | 10/2013 | Duplan |

* cited by examiner

| Name | Direction | Description |
|---|---|---|
| Loopback | Phone→P-Beam | -Message sent to P-Beam gets echo'd back unchanged.<br>-Provides a means for to test the reliability of the communications with the dongle both in production and in the field as a power-on check. |
| Loopback Response | P-Beam→Phone | -Exact duplicate of the Loopback message received. |
| Get Serial # | Phone→P-Beam | -Request for the unique serial number stored in the ARM chip.<br>-Can be used as a means of uniquely identifying each device from a production standpoint. |
| Serial # Response | P-Beam→Phone | -Returns the 16 byte unique serial number for the ARM chip. |
| Get Firmware Version | Phone→P-Beam | -Requests firmware version from P-Beam. |
| Firmware Version Response | P-Beam→Phone | -Returns the firmware version is form: xx.yy.zz. |
| Get Hardware Version | Phone→P-Beam | -Requests P-Beam hardware version. |
| Hardware Version Response | P-Beam→Phone | -Return hardware version. |
| Hop Sequence Table | Phone→P-Beam | -Transfer of the *hop sequence table* structure.<br>-An Acknowledge msg should be received back from the P-Beam device indicating success/failure. |
| Symbol Data Table | Phone→P-Beam | -Transfer beam timing data table as a segmented file transfer. |
| Start Beaming | Phone→P-Beam | -Initiates beaming of the bar code information using a combination of the beam timing table and the sweep timing table it has previously received.<br>-Include a value indicating the number of complete beaming cycles that are to be repleated. |

*FIG. 9A*

| | | |
|---|---|---|
| LED Test | Phone→P-Beam | -Provides a means of flashing the LED for an extended period of time to be used for both production test, and as a means of providing a visible confirmation in the field as to proper hardware operation.<br>-The message includes a 16 bit value that indicates the LED on time in 1msec resolution.<br>-Any new message received by the P-Beam device will immediately turn off the LED if it remains on for an extended period of time. |
| Jump into Bootloader | Phone→P-Beam | -Forces execution into the bootloader application. |
| Firmware Upgrade | Phone→P-Beam | -Transfer firmware binary program file as segmented file transfer. |
| Status | P-Beam→Phone | -This message is repeated every 250 msec after power-up/reset until the P-Beam device receives the first communications from the phone app.<br>-This message is also sent upon completion of a beaming sweep. |
| Acknowledge | P-Beam→Phone | -Acknowledge of receipt of any of the above messages that does not otherwise have an explicit response expected back. |

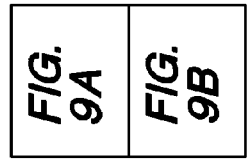

| Message ID | Data Field Format | Description |
|---|---|---|
| BBID_MSG_LOOPBACK | {1 to MAX_DATA_LEN data bytes} | -1 to MAX_DATA_LEN bytes of data (*) |
| BBID_LOOPBACK_RESP | {1 to MAX_DATA_LEN data bytes} | -Data returned should exactly match the request. |
| BBID_MSG_GET_SN | {} | -No data in request. |
| BBID_SN_RESP | {16 byte serial number} | -ARM chip serial number is 128 bits long (16 bytes). |
| BBID_GET_FW_VERSION | {} | -No data in request. |
| BBID_FW_VERSION_RESP | XX YY ZZ | -3 byte response:<br>XX= major version # (sent first)<br>YY= minor version #<br>ZZ= revision # (sent last) |
| BBID_GET_HW_VERSION | {} | -No data in request. |
| BBID_HW_VERSION_RESP | XX YY | -2 byte hardware version<br>XX= major version # (sent first)<br>YY= revision # (sent last) |
| BBID_HOP_SEQ_TBL | {1 byte # entries "n" to follow}<br>{BW1}{NS1}{ISD1}{NP1}{IPD1}{IHD1}<br>....<br>{BWn}{NSn}{ISDn}{NPn}{IPDn}{IHDn} | -First byte indicates number of table entries.<br>-First table entry (see "Beaming requirements" section).<br>-Last table entry.<br>-BBID_ACK response is expected.<br>NOTE: if the size of this table is going to exceed MAX_DATA_LEN bytes, then this message will also require segmenting. |

FIG. 12A

| | | |
|---|---|---|
| BBID_SYMBOL_TBL | {2 BYTE RECORD NUMBER(0..65535)} {2 byte total record count (1..65555)} {up to MAX_DATA_LEN-4 bytes of symbol data} | -2 byte {lsbyte first} record number. -2 byte {lsbyte first} total record count. -1 to 32 bytes of symbol data (\*\*). -A BBID_ACK response is expected for each record sent. |
| BBID_START_BEAM | {1 byte repeat count} | -Start beaming. -A BBID_ACK response is expected. |
| BBID_LED_TEST | {16 bit LED "ON" time} | -16 bit (lsbyte first) LED "ON" time in msec resolution. -A BBID_ACK response is expected. |
| BBID_BOOT_LOAD | {0x5A, 0xA5, 0xF0, 0x0F, 0x3C, 0xC3} | -Force execution of bootloader. -Data must match that shown exactly else command is ignored. -A BBID_STATUS response is expected from within the bootloader application (i.e. bit2 of status byte must be set!). |
| BBID_FIRMWARE_UPLOAD | {2 byte record number (0..65535)} {2 byte total record count (1..65555)} {up to MAX_DATA_LEN-4 bytes of binary file data} | -2 byte {lsbyte first} record number. -2 byte {lsbyte first} total record count. -1 to 32 bytes of binary file data. -BBID_ACK response is expected for each record sent. |

FIG. 12B

| | | |
|---|---|---|
| BBID_STATUS | {1 status byte} | -P-Beam status byte.<br>Bit0=1=>Power-up/reset just completed (cleared after first msg sent by P-Beam device).<br>Bit1=1=>Comms error detected (clear after status msg sent).<br>Bit2=1=>Running from Bootloader app.<br>Bit3=1=>Bearning sweep completed.<br>Bit4=1=>Invalid CRC32 on main application firmware.<br>Bit5=1=>Execution. |
| BBID_ACK | {1 byte ACK/NAK} | 0x06=>ACK (msg revd ok).<br>0x15=>NAK (resend last msg). |

(*) The value of MAX_DATA_LEN will initially be set to 36 bytes, allowing segmented transfers to send up to 32 bytes of file data.
(**) Symbol data will be shifted out of bytes msbit first, as is typical for SSP/SPI style serial data transfers. The phone application should encode the bits in each byte in this fashion before sending to the P-Beam device.

| FIG. 12A |
|---|
| FIG. 12B |
| FIG. 12C |

*FIG. 12*

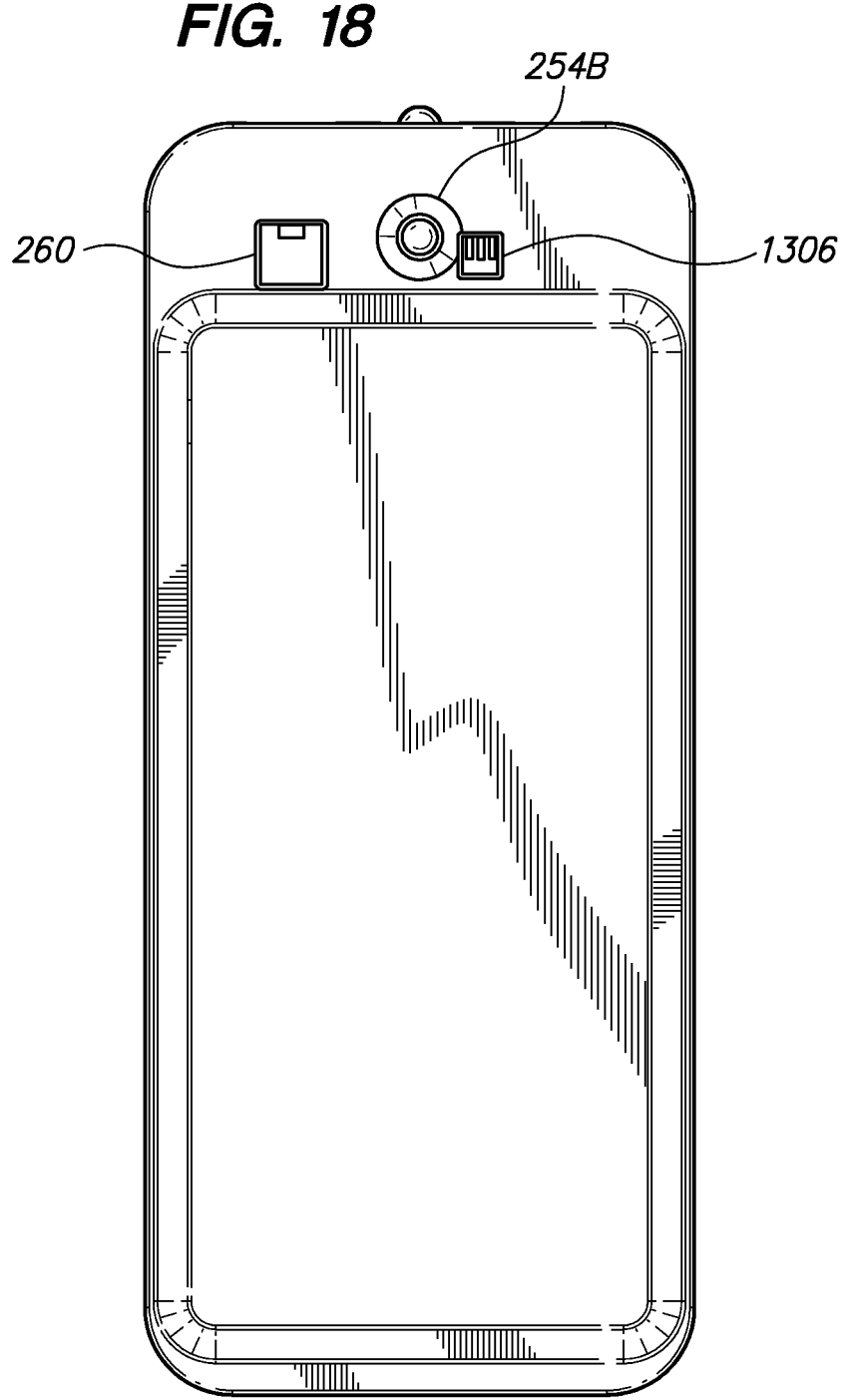

US 9,558,437 B2

SYSTEMS FOR AND METHODS OF COMMUNICATING BARCODE INFORMATION TO POINT-OF-SALE TERMINAL

This application claims the benefit of U.S. Provisional Application No. 61/921,049, filed Dec. 26, 2013, the entire contents of which are hereby incorporated by reference.

BACKGROUND OF THE INVENTION

This invention relates generally to communicating encoded information from a personal electronic device to a barcode scanner or other point-of-sale (POS) terminal.

A barcode is a machine-readable representation of data. Barcodes are typically printed on items, such as paper labels or packaging for goods, manufacturer's or retailer's coupons, or on tickets or passes such as airline boarding passes. Barcode scanners (also referred to as barcode readers) are used to extract information from barcodes. Barcode scanners are found in many different types of facilities including stores and supermarkets, airport security check-in and boarding areas, stadiums, libraries, test centers, conference centers, and in many other contexts. The use of barcode scanners has dramatically increased the speed and convenience of performing many commonplace transactions.

While typically printed on paper or other objects, barcodes may also be presented on the electronic displays of personal electronic devices such that the barcode can be read by a barcode scanner. While it can be useful to present coupons and other information in barcode form on the display screen of a personal electronic device, there are disadvantages. Some barcode scanners, for example, cannot reliably read barcodes displayed on certain types of displays because the contrast ratio between the bars and spaces shown on the display screen, which typically is a liquid crystal display ("LCD"), is not sufficient. Further, the physical dimensions and/or resolution of the display screen may also limit the size of the barcode that may be displayed at one time.

A technology that simulates barcodes using pulsed light and thereby overcomes various limitations of static screen-displayed barcodes is disclosed in, for example, U.S. Pat. No. 6,685,093 issued Feb. 3, 2004 to Challa et al. However, some personal electronic devices are not capable of pulsing a light source quickly enough, or are controlled by application program interfaces that for technical or business reasons cannot be modified to pulse a light source as necessary to accomplish this technique.

Therefore, what is needed is an improved technique for communicating barcode information.

SUMMARY OF THE INVENTION

A method of communicating barcode information using audio signaling is disclosed in accordance with an embodiment of the present invention. A mobile device being brought into physical proximity to a communication bridge device is detected. Two-way audio communication is commenced between the mobile device and the bridge device upon detection of the mobile device by the bridge device. Barcode information is communicated from the mobile device to the bridge device. The barcode information is converted into a pulsed signal to simulate scanning of a static image of a barcode. A human perceptible signal is provided that indicates the barcode information has been received into the bridge device. The barcode information is transmitted as light pulses emitted from the bridge device for reception by a barcode scanner.

BRIEF DESCRIPTION OF THE DRAWINGS

The present invention is described with respect to particular exemplary embodiments thereof and reference is accordingly made to the drawings in which:

FIG. 9A-B illustrate a table of message types for an audio signaling communication protocol in accordance with an embodiment of the present invention;

FIG. 12A-C illustrate a table of message data formatting for an audio signaling communication protocol in accordance with an embodiment of the present invention;

FIG. 18 is a rear view of the electronic device housing in accordance with an embodiment of the present invention.

DETAILED DESCRIPTION OF A PREFERRED EMBODIMENT OF THE INVENTION

Figure 1:
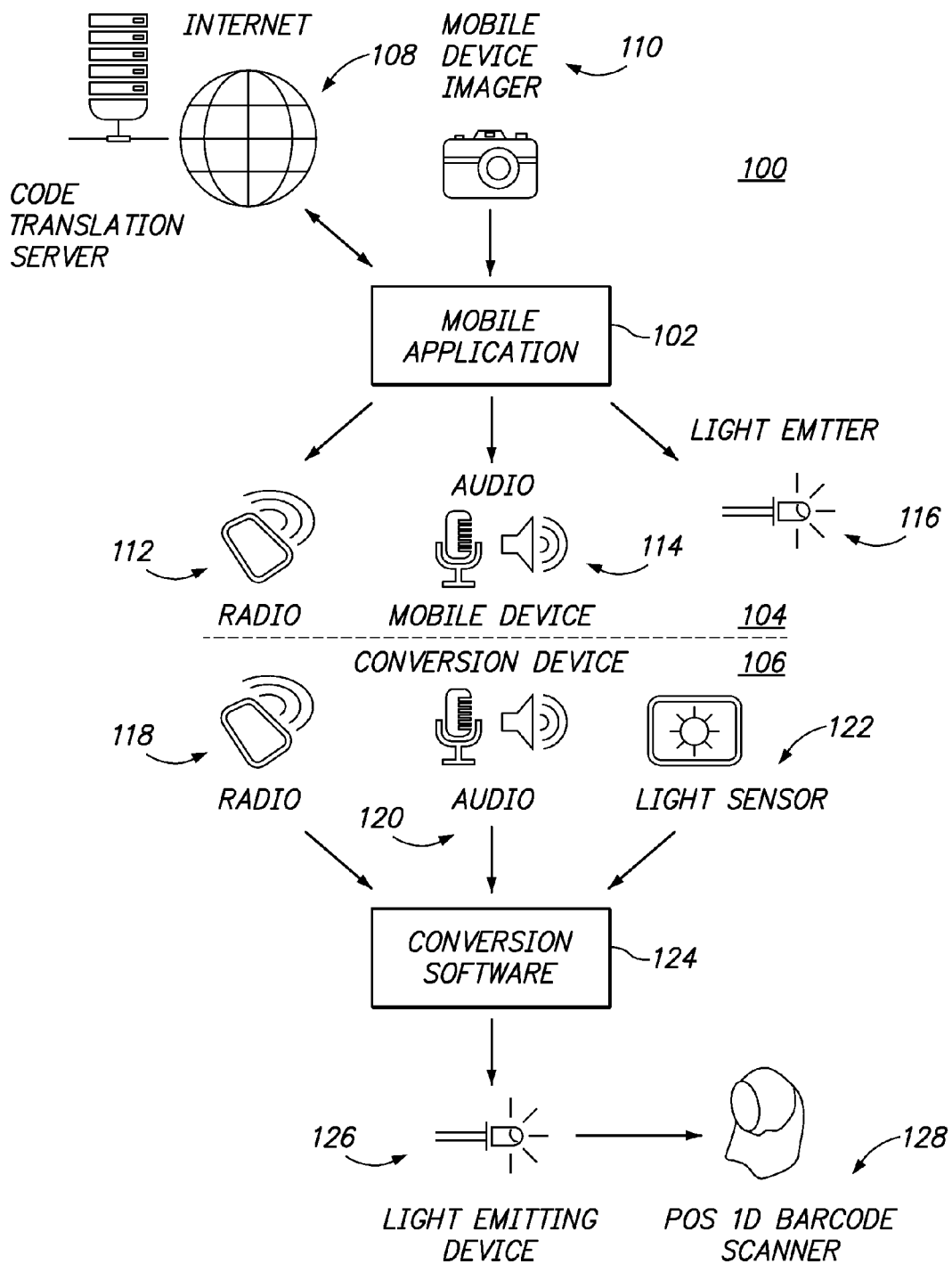
FIG. 1 illustrates a block schematic diagram of a system for communicating barcode information in accordance with an embodiment of the present invention.

Techniques described herein facilitate reliable communication of barcode information from personal electronic devices to point-of-sale (POS) terminals. Barcode information is information that includes a barcode or is information from which a barcode can be derived. For a one-dimensional barcode, the barcode information includes a representation of an arrangement of bars and spaces. Personal electronic devices are electronic devices that can be easily carried on the person, and include, for example, mobile phones (e.g. smartphones), tablet computers, personal digital assistants (PDAs), gaming devices, audio and video players, fobs, smart watches, and universal serial bus (USB) flash drives. Personal electronic devices are suitable for many uses, including communications, entertainment, security, commerce, guidance, data storage and transfer, and so forth, and may be dedicated to a particular use or may be suitable for a combination of uses. The techniques described herein enable a large and growing population of personal electronic devices to use established and widely adopted barcode standards to access the current commercial infrastructure, which is highly dependent on barcode scanners at points of sale. The techniques described herein may be used to access a wide variety of goods and services.

In accordance with an embodiment of the present invention, barcode information is acquired by, or stored within, a personal electronic device. The personal electronic device communicates the barcode information to a bridge device (also referred to herein as a "P-Beam" device). In an embodiment, this communication is via audio communication (i.e. sound waves). The bridge device then communicates the barcode information to a POS terminal. The POS terminal can include a barcode scanner. In an embodiment, the bridge device can include a light source, such as one or more light-emitting diodes (LEDs), that can be driven by a controlled signal so that light from the light source simulates a reflection of a scanning beam being moved across a static visual image of the barcode. Such a light-simulated barcode technique is described in U.S. Pat. No. 6,685,093 issued Feb. 3, 2004 to Challa et al., in U.S. Pat. No. 6,877,665, issued Apr. 12, 2005, to Challa et al., and in U.S. Pat. No. 7,857,225, issued Dec. 28, 2010, to Challa et al., the entire contents of all of which are hereby incorporated by reference.

While the POS terminal can include a barcode scanner, the personal electronic device need not be able to directly convey the barcode information to the barcode scanner. Rather, the personal electronic device conveys the barcode information to the bridge device which then conveys the barcode information to the POS terminal. The bridge device therefore serves as a bridge between a personal electronic device and existing POS terminals. As such, the present invention facilitates use of personal electronic devices for performing transactions that involve barcodes, even if the personal electronic device does not have the capability to convey barcode information directly to a POS terminal. The bridge device can, for example, be used to allow retailers to extract coupon information from a personal electronic device without the need to have specialized hardware in the personal electronic device itself. Data is transmitted from the personal electronic device to the bridge device, which can then convert the data into controlled light emissions to the barcode scanner. The barcode can, for example, represent an event ticket or a discount coupon for purchase of a retail item. The bridge device can, for example, be constructed within a housing that is permanently or semi-permanently positioned adjacent to point-of-sale equipment, such as a barcode scanner or cash register, at a retailer.

In some cases, personal electronic devices may be able to communicate barcode information directly to a barcode scanner. For example, a barcode may be displayed by the display screen of a personal electronic device and the barcode scanner may read the barcode displayed in this manner. However, some barcode scanners, for example, cannot reliably read barcodes displayed on certain types of portable electronic device displays. Alternatively, some personal electronic devices are equipped with light sources such as the device screen and/or light-emitting diodes (LEDs) that may be driven by a simulated signal so that light from the light source simulates a reflection of a scanning beam being moved across a static visual image of the bar code. However, some personal electronic devices are either not capable of pulsing a light source quickly enough, or are controlled by application program interfaces that for any number of technical or business reasons cannot be modified to pulse the light source as necessary. Further, some types of personal electronic devices may not be equipped with a suitable light source, even though they are capable of receiving or storing information of a type that could usefully be communicated to a bar code scanner. Personal electronic devices that are unable to communicate information directly to a bar code scanner may be enabled to do so by the use of a bridge device in accordance with embodiments of the present invention.

FIG. 1 illustrates a block schematic diagram of a system 100 for communicating barcode information in accordance with an embodiment of the present invention. As shown in FIG. 1, a mobile application 102 operates on a personal electronic device 104, also referred to as a mobile device. The mobile application 102 can be a software application program loaded into and stored by a data storage medium located within the mobile device 104. When executed, the application program 102 causes the mobile device 104 to perform various operations including those described herein. Together, the mobile application 102 and mobile device 104 interface with a bridge device 106. The mobile device 104 can receive barcode information from any viable communications methodology, including but not limited to, a network 108, such as the Internet 108, a LAN, or by using an on-board accessory camera 110 to read a barcode. Barcodes may be sent to the mobile device 104, for example, by retailers or advertisers via text or email message. Barcodes can additionally be retrieved from such sources under control of a user. For example, a person operating the mobile device 104 can retrieve a barcode from a manufacturer's or retailer's website. The barcodes can be stored by the mobile device 104 for later retrieval. A barcode can be a one-dimensional or two-dimensional barcode. A two-dimensional barcode may have one-dimensional barcode data embedded within it, or a code translation server or website may be queried with a two-dimensional barcode or any other data unique to the product or service under consideration, and a one-dimensional barcode may be returned. A user may engage in a transaction using the mobile application 102, for example, by selecting a funding source, a particular retailer, an item they wish to purchase, and/or one or more barcodes.

Once the mobile device 104 has retrieved or otherwise obtained a barcode, it may then transmit the barcode information to the bridge device 106 via a compatible transmission channel. The transmission channel can be, for example, but not limited to, radio transmission 112, e.g. Near Field Communication (NFC), audio communication 114, such as Frequency Shift Key (FSK) encoding, or by light modulation, such as by modulating a light source 116 of the mobile device 104. While the mobile device 104 may not be able to modulate an LED or its backlight fast enough to directly simulate the barcode so that it can be reliably received by a one-dimensional scanner, the mobile device 104 may employ a light modulation scheme that modulates the light at a rate that is slower than that accepted by a barcode scanner in order to transmit the data to the bridge device 106. The bridge device 106 is configured to implement corresponding communications with the mobile device 104, including for example, radio transmission 118, e.g. Near Field Communication (NFC), audio communication 120, or by a light transmission sensing 122. It will be apparent that the mobile device 104 and the bridge device 106 can be configured to implement any one of these communications channels, or any combination of them, and that other types of communication channels may be substituted. For example, communication between the mobile device 104 and bridge device 106 may be attempted via one channel, and if that is unsuccessful, communication via a different channel may then be attempted. Moreover, these communication channels can be one-way, in which information is transmitted from the mobile device 104 to the bridge device 106, or two-way in which information can be transmitted in both directions. Also, communication may be attempted directly between the mobile device 104 and a barcode scanner before attempting communication via the bridge device 106.

As mentioned, in an embodiment, Near Field Communication (NFC) may be used to transfer data between the mobile device 104 and the bridge device 106. NFC is a set of standards that facilitates secure, short-range radio communication between personal electronic devices, such as mobile phones, PDAs, computers and payment terminals. NFC can be used in connection with secure point-of-sale payments. As also mentioned, in an embodiment, frequency-shift keying (FSK) can be employed for audio communications between the mobile device 104 and the bridge device 106. FSK is a frequency modulation scheme suitable for audio communication.

As shown in FIG. 1, the bridge device 106 can include a software application program 124. The software 124 can be a software application program loaded into and stored by a data storage medium located within the bridge device 106. When executed the software 124 causes the bridge device 106 to perform various operations including those described herein, and including communicating with mobile devices and POS terminals and converting barcode information received from a mobile device to a format suitable for a POS terminal.

In an embodiment, the user of the mobile device 104 can initiate a transaction by accessing the application 102 and selecting a credit for a particular store, a coupon the user wishes to use or an item the user wishes to purchase. The application 102 can retrieve the appropriate barcode information (e.g. from its own memory), and may also display an image related to the barcode or item on the display screen of the mobile device 104. The user can then bring the mobile device 104 into proximity of the bridge device 104, for example, by placing the mobile device 104 on a designated platform of the bridge device 106, adjacent to a POS terminal. In another embodiment, upon retrieval of the appropriate barcode, the mobile device 104 can immediately begin sending a signal that can be detected by the bridge device to indicate that the mobile device 104 is ready to begin data transfer. For example, the mobile device 104 can immediately begin sending an audio tone that can be detected by the bridge device's audio input. In another embodiment, upon retrieval of the appropriate barcode, the mobile device 104 can immediately begin sending an NFC signal that can be detected by the bridge device 106 to indicate that the mobile device 104 is ready to begin data transfer.

The bridge device 106 can detect the presence of the mobile device 104 in its proximity by any appropriate technique, including but not limited to, an infra-red (IR) proximity sensor, ultrasonic proximity detector, capacitive proximity sensor, imaging sensor, light sensor, or opto-interrupter. The user can also initiate or confirm the placement detection via a button or switch on the mobile device 104, or the device 104 may initiate a tone or display flash at a particular frequency that can be detected by the bridge device 106. Once proximity of the mobile device 104 is detected or otherwise indicated, the bridge device 106 can initiate communication with the mobile device 104.

Communication of the barcode information and any other protocol information required for authentication and security is preferably completed within a period of a few seconds or less and preferably in less than one second. Upon completion of the transfer, the bridge device 106 can provide a human perceptible indication that the transfer from the mobile device 104 is complete and that the bridge device 106 is ready to communicate the barcode information to the POS terminal. For example, bridge device 106 can begin flashing an LED indicating it is ready. In one embodiment, the retailer uses a handheld scanner and the flashing LED instructs the retail clerk to point the scanner at the bridge device 106. A light emitting device 126 of the bridge device 106 can then transmit the barcode information which is received and accepted by a barcode scanner 128 employed by the retailer. In another embodiment, a fixed mount barcode scanner is employed by the retailer, and a light emitter 126 of the bridge device 106 can be rotated or pointed to the scanner, or an external emitter can be connected to the bridge device 106 such that the external emitter can be remotely located near the scanner.

Alternatively or additionally to the bridge device providing a human perceptible indication that the transfer from the mobile device 104 is complete, the mobile device 104 can provide such an indication. For example, the mobile device 104 can display an indication on its display screen or provide an audible indication that the transfer is complete. The mobile device 104 may learn that the transfer is complete by virtue of its participation in the transfer or the bridge device 106 may signal to the mobile device 104 that the transfer is complete. The mobile device 104 can then respond by providing the human perceptible indication.

Figure 2:
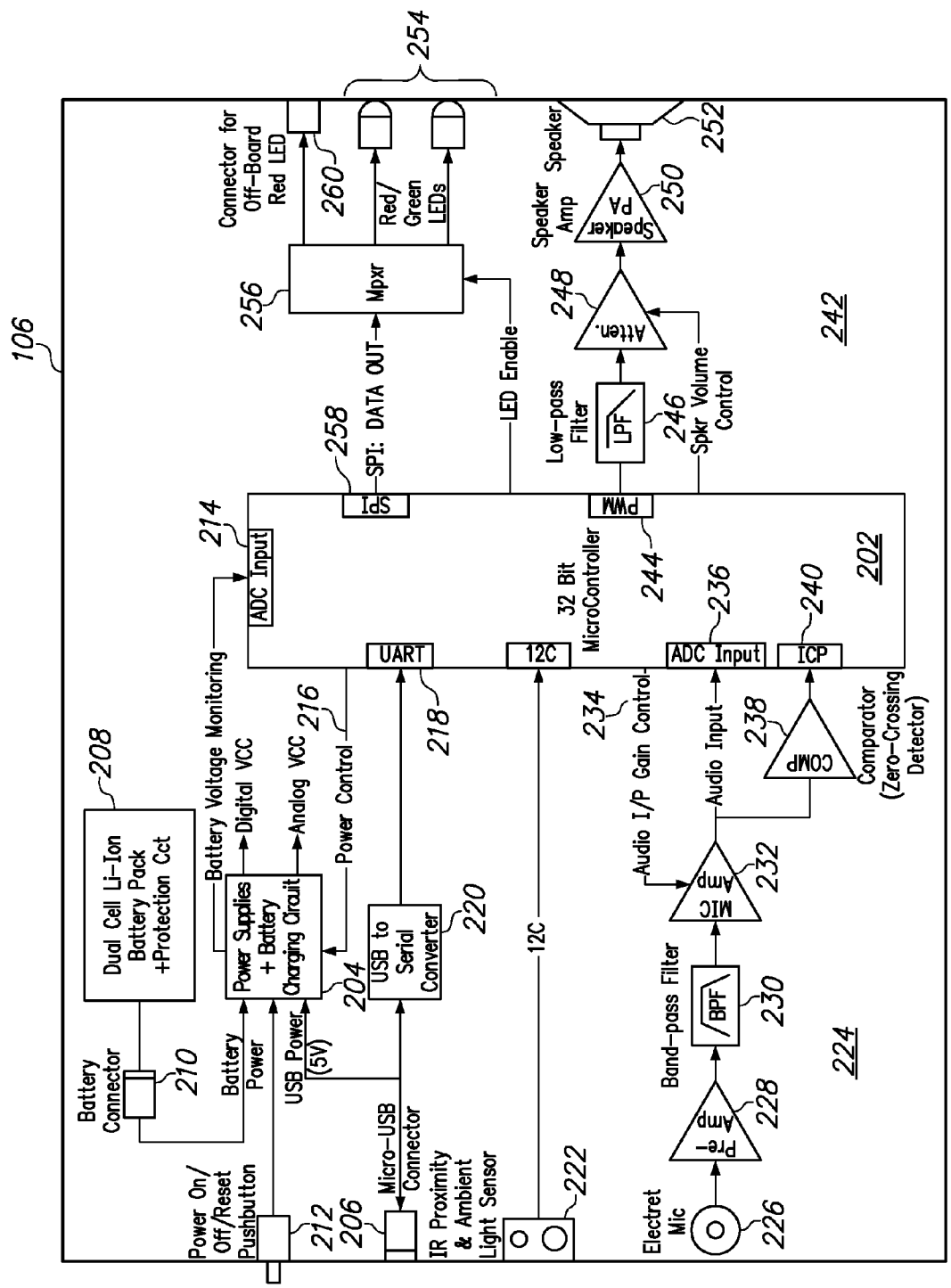
FIG. 2 illustrates a block schematic diagram of a bridge device for communicating barcode information in accordance with an embodiment of the present invention.

FIG. 2 illustrates a block schematic diagram of a bridge device 106 for communicating barcode information in accordance with an embodiment of the present invention. As shown in FIG. 2, the bridge device 106 includes a processor 202 (e.g. a micro-controller) and a power supply 204 for providing power to the various components of the bridge device 106. The power supply 204 can be coupled to a connector 206 for connecting the power supply 204 to an external source of power. For example, the connector 206 can be a micro-USB (universal serial bus) connector that provides power delivery to the device 106 from an external source. Alternatively, the connector 206 can include another type of connector such as a DC plug that receives power from an external source, such as an AC-to-DC power converter. In this case, the power converter can be for example a "wall-wart" style power converter.

The power supply 204 can provide two outputs, labelled "Digital VCC" and "Analog VCC" in FIG. 2. The Digital VCC output can supply power to digital circuitry of the bridge device 106. Such digital circuitry can include, for example, the processor 202. The Analog VCC output can supply power to analog circuitry of the bridge device 106. Such analog circuitry can include, for example, amplifiers and filters described herein.

The power supply 204 can also be coupled to a battery 208 via a battery connector 210. The power supply 204 can charge the battery by drawing power from the external power supply. The battery can be used to supply backup power in the event the external power supply is unavailable or disconnected from the bridge device 106. A mechanical switch 212 can be coupled to the power supply 204 that can be used to turn the device 106 on and off or to reset the device 106. The power supply 204 can be coupled to an analog-to-digital (ADC) input 214 of the processor 202 to enable the processor 202 to monitor the battery voltage. The power supply 204 can be controlled by the processor 202 via a power control link 216. This link 216 can be used, for example, to cause the power supply 204 to charge the battery 208, as appropriate.

The USB connector 206 can be coupled to an interface 218 of the processor 202 via a USB to serial converter 220. The interface 218 can include a universal asynchronous receiver/transmitter (UART). An external device, such as POS equipment, can communicate with the processor 202 via the converter 220, for example, to provide software updates.

A proximity sensor 222, such as an IR proximity sensor or a capacitive sensor, can be coupled to the micro-controller 202. The proximity sensor 222 is used to detect the presence of the mobile device 104. For example, the IR proximity sensor 222 can detect when the mobile device 104 is within approximately 25-50 mm, or within approximately 2-3 inches, of the IR sensor 222. Detection of the mobile device 104 by the sensor 222 can be used to initiate communication between the bridge device 106 and the mobile device 104.

An audio input channel 224 can also be coupled to the micro-controller 202. The audio input channel 224 can include a microphone 226 for receiving audio signals from the mobile device 104, pre-amplifier 228 for amplifying signals received by the microphone 212, a band pass filter (BPF) 230 for filtering frequency components outside an expected frequency range for the audio communication signals and a microphone amplifier 232 for adjusting a microphone input signal to the processor 202 using a gain control output signal 234 produced by the processor 202. An analog-to-digital converter (ADC) 236 can be provided at an input to the micro-controller 202 for sampling the incoming filtered audio signal. A high-speed comparator 238, preferably equipped with a software controllable threshold, can be provided to detect zero crossings and/or peaks of the analog filtered audio signal. A high-speed capture input 240 to the microcontroller 202 can be used to provide precise waveform timing based on the output of the comparator 238.

In an embodiment, the bridge device 106 may be equipped with a secondary microphone, isolated from the audio signals of the mobile device 104, for receiving and canceling ambient noise. It will be apparent that while such a secondary microphone channel is not required, it can be expected to help improve audio signal reception by reducing effects of ambient noise. In this case, the signal from the secondary microphone can be applied to an inverting amplifier input while the signal from the primary microphone 226 can be applied to a non-inverting microphone input. Software controlled attenuation may be applied to the ambient noise microphone signal. Ambient noise received by the secondary amplifier can then be subtracted from the mobile device communications signal.

Where the bridge device is constructed within a housing, the primary microphone can be located, for example, on or near a top surface of the housing. Where a secondary microphone is provided, the secondary microphone can be located away from the primary microphone, for example, on or near the bottom of the housing or on a side opposite that of the primary microphone, so as to isolate the secondary microphone from the audio signals emitted by the mobile device 104.

In embodiment, frequency-shift keying (FSK) can be employed for bidirectional audio communications between the mobile device 104 and the bridge device 106. In accordance with FSK at least two different frequency audio tones are employed to convey digital information. For example, a "zero" bit value can be represented with a 1200 Hz tone, and a "one" bit value can be represented with a 2400 Hz tone. In this case, the passband of the BPF 230 can be centered between the low and high FSK frequencies and the passband can have bandwidth of approximately 4 KHz to help isolate the FSK signal from ambient noise. It will be apparent, however, that different tone frequencies can be utilized and that a different modulation technique can be utilized, for example, audio frequency-shift keying (ASFK) can be utilized.

As shown in FIG. 2, an audio output channel 242 can also be coupled to the micro-controller 202. A pulse width modulation (PWM) output 244 can be used to produce FSK tones output by the bridge device 106. A hardware low pass filter (LPF) 246 can be used to filter the PWM output signal so as to produce a pseudo-sine wave representation of the two FSK frequencies used. A software controlled attenuator 248 can be used to scale the output signal amplitude. A speaker amplifier 250 amplifies the outgoing audio signal while a speaker 252 converts the analog signal to audio.

LEDs 254 can be coupled to the micro-controller 202, e.g. via a multiplexer 256, to provide both status information and the barcode scanner signaling/simulation. The LEDs 254 can include multiple LEDs of different colors (e.g. red and green) or the LEDs can include one or more multi-color LEDs (e.g. red/green). The green color can be used to indicate the bridge device 106 is powered and ready. The red color can be used to indicate that the bridge device 106 has received its data from the mobile device 104 and is ready to be scanned by a barcode scanner. It will be apparent that any visual or aural device, including but not limited to, an output tone or beep, LED or LCD display could also be used to convey status information to the user. An output of the micro-controller 202 can provide precise timing control of one or more of the LEDs 254 to perform pulsed light barcode simulation. For example, the red LED output can be controlled from a serial peripheral interface (SPI) 258 coupled to the micro-controller 202 to provide precise timing control of the LED during the barcode simulation process. A connector 260 can be provided so that an external LED can be connected to the bridge device 106 and controlled to perform barcode simulation. In this case, the external red LED can be positioned so that its emitted light can be detected by a barcode scanner optical input of the POS equipment. The light used for the barcode simulation can be in the visible red or infra-red ranges of wavelengths.

Figure 3:
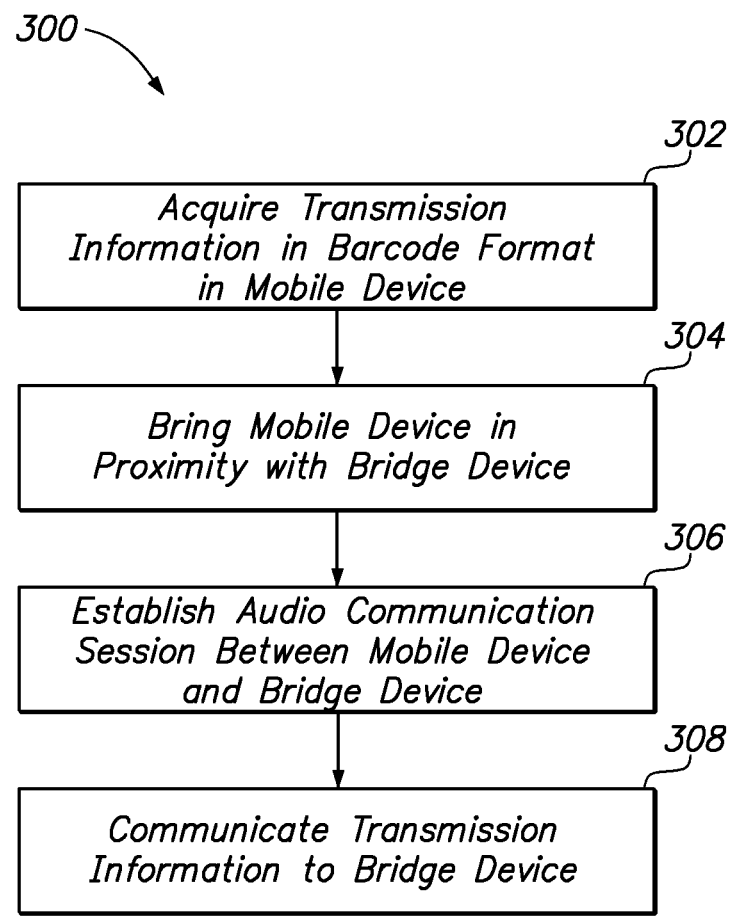
FIG. 3 illustrates a flow diagram of a method performed by a mobile device for communicating barcode information in accordance with an embodiment of the present invention.

FIG. 3 illustrates a flow diagram of a method 300 performed by a mobile device for communicating barcode information in accordance with an embodiment of the present invention. The method 300 can be performed by the mobile device 104 of FIG. 1. In a step 302, the mobile device 104 acquires transmission information in barcode format. The mobile device 104 can receive the barcode information from a network, such as the Internet 108, a LAN, or by using an on-board camera to photograph a barcode. The barcode information may be sent to the mobile device 104, e.g., by retailers or advertisers, or the barcode information can be retrieved from such sources under control of a user of the mobile device 104. Barcode information may be stored by the mobile device 104 for later use. The mobile application 102 organizes the barcodes and allows the user to select a barcode of interest to the user.

In an embodiment, the user may employ an image capture capability of the mobile device 104 (i.e. an on-board camera) to capture a one-dimensional barcode image or a two-dimensional encoded image, including but not limited to, a QR Code, a DataMatrix, an EZCode, an Aztec code, or a Microsoft Tag. Barcode data may be explicitly embedded within these two-dimensional codes, or information embedded in the barcode may refer to an internet URL, short URL, or implicit URL which may be interrogated by the application 102 (FIG. 1) to retrieve one-dimensional barcode information.

In a step 304, the mobile device 104 is brought into proximity of the bridge device 106. For example, the user may be in a retail store equipped with the bridge device 106 at the checkout counter. The user may select an item to purchase and may also select a manufacturer's coupon for that item via the application 102 on the mobile device 104. The user may then bring the item to the checkout counter to make the purchase. While the retail clerk is ringing up the item, the user may place the mobile device 104 onto a designated platform of the bridge device 106 or may hold the mobile device 104 near or above the bridge 106.

In a step 306, an audio communication session is established between the mobile device 104 and the bridge device 106. For example, once the bridge device 106 detects that the mobile device 104 is near, the bridge device 106 may send an audio tone (or a message in the form of a sequence of tones) to the mobile device 104. The mobile device 104 may then respond to the tone with a tone of its own (or with a response message in the form of a sequence of tones).

In a step 308, the mobile device 104 sends the barcode information to the bridge device 106 during the audio communication session via audio signaling. Once the barcode information has been sent, the mobile device 104 may end the communication session. The mobile device 104 may await receipt of an acknowledgement message from the bridge device, indicating that the barcode information has been received, before ending the session.

In an embodiment, information for multiple barcodes may be communicated from the mobile device 104 to the bridge device 106 in a single audio communication session. For example, the user may have selected several barcodes related to items being purchased together by the user in a purchase transaction. In this case, information for the several barcodes may be communicated to the bridge device 106 during step 308 before the communication session terminates. In another embodiment, multiple communication sessions may be initiated in serial fashion until the information of the several barcodes is communicated to the bridge device 106.

Figure 4:
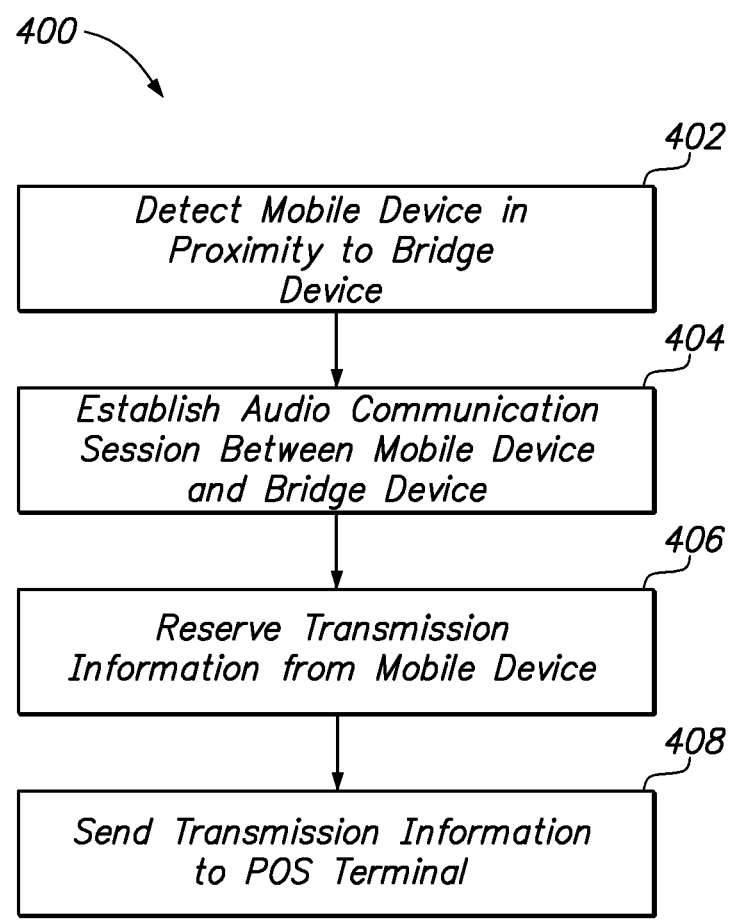
FIG. 4 illustrates a flow diagram of a method performed by a bridge device for communicating barcode information in accordance with an embodiment of the present invention.

FIG. 4 illustrates a flow diagram of a method 400 performed by a bridge device for communicating barcode information in accordance with an embodiment of the present invention. The method 400 can be performed by the bridge device 106 of FIGS. 1 and 2. In a step 402, the bridge device 106 detects that a mobile device 104 is in proximity of the bridge device 106. For example, referring to FIG. 2, the bridge device 106 may be equipped with a sensor 222 that detects when a mobile device 104 is brought within 25-50 mm of the bridge device 106.

In a step 404, an audio communication session is established between the mobile device 104 and the bridge device 106. For example, once the bridge device 106 detects that the mobile device 104 is near, the bridge device 106 may send an audio tone (or a message in the form of a sequence of tones) to the mobile device 104. The mobile device 104 may then respond to the tone with a tone of its own (or (or with a response message in the form of a sequence of tones).

In a step 406, the bridge device 106 receives the barcode information from the mobile device 104 via audio signaling. Once the barcode information has been sent, the bridge device 106 may send an acknowledgement message (ACK) to the mobile device 104, indicating that the barcode information has been received or a non-acknowledgement message (NAK) indicating that the information was not successfully received. In addition, the bridge device 106 preferably provides a human perceptible indication that the bridge device 106 is ready to provide the barcode information to a POS terminal. For example, the LED 254 shown in FIG. 2 may be illuminated with red light or may repeatedly flash a red light.

In a step 408, the bridge device 106 provides the barcode information to the POS terminal. This can be accomplished by the bridge device activating a pulsed light source (e.g. red LED 254 of FIG. 2) that simulates a scanned barcode image. While the light source is actively being pulsed, a retail clerk using a handheld barcode scanner can point the scanner at the LED. The simulated scanned barcode information can then be used at the POS terminal to complete the transaction.

Thus, the flashing LED cues the clerk to scan the LED—in this case, the LED performs two functions: the first function being to notify the clerk that the bridge 106 is ready to be scanned and the second function being to communicate the barcode via pulsed light. To accomplish the first function, the LED may be flashed at frequency that is not perceptible to the barcode scanner but that is human perceptible. To accomplish the second function, the LED may be flashed at a frequency that is not human perceptible but that is perceptible to the barcode scanner.

Alternatively or additionally, an LED coupled to connector 260 of FIG. 2 can simulate a scanned barcode image. In this case, the LED can be oriented to direct light pulses toward a fixed-position scanner of the POS equipment. In this case, use of a handheld scanner is not required.

In another embodiment, rather than having the bridge device 106 simulate a barcode via a pulsed light, the bridge device 106 can provide the barcode information to the POS terminal in a different manner. For example, the bridge device 106 can be coupled to the POS terminal via a wired connection, for example, via a universal serial bus (USB) connection. In this case, use of the handheld scanner would also not be needed. When scanning of the LED by the clerk is not required, the LED 254 may perform only the first function, as described above.

Communications between the mobile device 104 and bridge device 106 can use FSK signaling frequencies and bit encoding as is used by Universal Asynchronous Receiver/Transmitter (UART). In this case, bit transmission is asynchronous. At the FSK level, this means that the bit durations for the "1" and "0" frequencies must be the same (equal durations per bit).

Byte level synchronization can be provided by the use of a "start" and a "stop" bit. An idle line level can be at the higher of the two frequencies in use. The start of a new byte transmission can be signaled by a transition from the higher frequency to the lower frequency for one bit time duration. At the start of a new message, there should be at least four bit durations of the FSK high frequency prior to the first start bit (at the FSK low frequency) to signal the start of the first bit/byte of a transmission. At the end of the last byte of each message transmitted, the transmitter should transmit four bit durations at the FSK high frequency then disable its audio transmission to listen for a response from the receiver (ACK/NAK message in the case of the bridge device 106 responding to a message received).

Audio communications are preferably two-way and half-duplex, so only one side communicates at a given time. This allows the use of the same FSK frequencies in both directions and simplifies the FSK decoding requirements on both ends of the link. All messages sent by the mobile device 104 should require an explicit ACK/NAK message be received from the bridge device 106 in order to consider a message to have been completed successfully.

Figure 5:
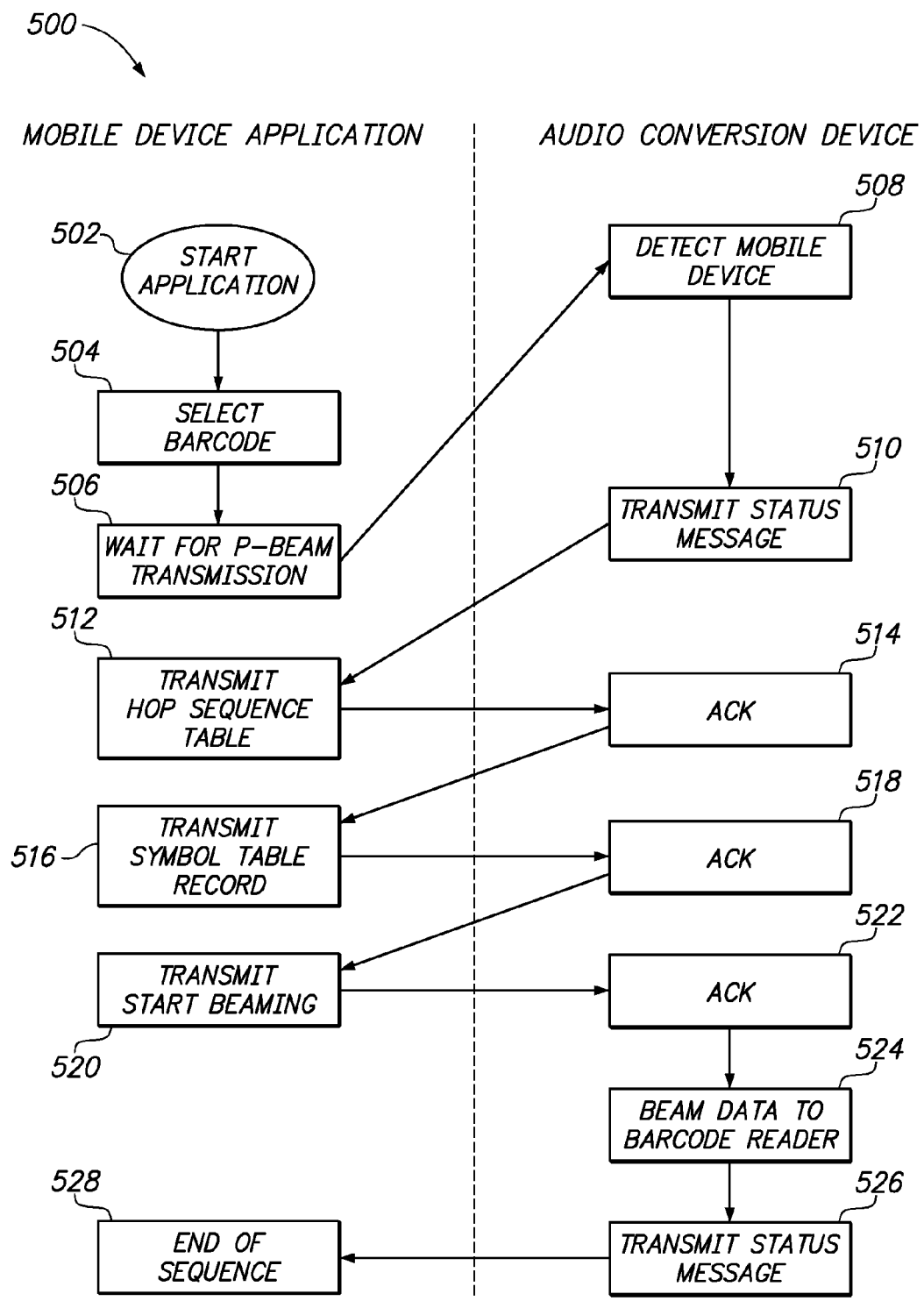
FIG. 5 illustrates an audio communication sequence for communicating barcode information in accordance with an embodiment of the present invention.

FIG. 5 illustrates an audio communication sequence 500 for communicating barcode information in accordance with an embodiment of the present invention. The left side of FIG. 5 represents operation of the mobile device 104 operating in accordance with the mobile application 102. The right side of FIG. 5, separated from the left side by a vertical dashed line, represents operation of the bridge device 106 operating in accordance with its software 124.

The user of the mobile device 104 initiates the sequence by starting the application 102 in a step 502 and selecting the barcode to be used in a step 504. In another embodiment, the application may run directly within the operating system (OS) of the device 104, or the device may be a dedicate device such that it is configured so that the methods described herein are the only functions it performs. In some embodiments the barcode may be selected from a list stored within the mobile device 104, or acquired via the Internet or via the camera function of the device.

Once the barcode is selected, the user places the mobile device near the bridge device 106. For example, the application 102 may instruct the user to place the mobile device 104 near the bridge device 106. In an embodiment, a specified area or platform may be provided adjacent to or on top of the bridge device 106. In this case, the user may place the mobile device 104 on the platform. In other embodiments, the user may hold the mobile device 104 near the bridge device 106 or near the platform.

In a step 506, the mobile device 104 awaits a first transmission from the bridge device 106. In a step 508, bridge device 106 detects the mobile device 104. And, in a step 510, the bridge device 106 responds to detection of the mobile device 104 by transmitting a status message. One or more communications channels may be implemented. In this case, the status message may be sent via one or more of the available communication channels. The mobile device 104 determines with which channel it will communicate, if more than one channel is available.

The mobile device 104 receives the status message in a step 512. In response to this status message, the mobile device 104 transmits a hop sequence table. This table determines how many times a given sequence will be transmitted. The mobile device 104 then awaits receipt of an ACK message from the bridge device 106. This ACK message preferably corresponds specifically to the hop sequence table message.

In a step 514 the bridge device 106 acknowledges receipt of the hop sequence table by sending the specific ACK message. If no ACK is received, the mobile device 104 retransmits the hop sequence table, until the ACK is received or a specified number of retries has failed.

Upon receipt of the hop sequence table ACK, the mobile device 104 transmits a symbol table record in a step 516. The symbol table record contains all of the data to be transmitted for each "hop." A hop refers to a message being passed between the mobile device 104 and bridge device 106.

The bridge device 106 responds to receipt of the symbol table record in a step 518 with an ACK message. This ACK message preferably corresponds specifically to the symbol table record message.

In a step 520, the mobile device 104 responds to the ACK message by transmitting a start beaming command. In a step 522, the bridge device 106 responds with an ACK message. This ACK message preferably corresponds specifically to the start beaming command message. In a step 524, the bridge device 106 then transmits the barcode information contained in the hop sequence and symbol tables. When complete, the bridge device 106 transmits in, a step 526, a status message every 100 ms until a timeout is reached. The mobile device 104 terminates the sequence upon the receipt of the status message. The mobile application 102 can then return to the user to select another barcode.

In embodiment, multiple barcodes can be selected and combined into longer hop sequence and symbol tables, so that multiple barcode can be sent in one transaction. For example, one two-dimensional coded image or an implicit URL could retrieve multiple barcodes for transmission as part of a single transaction.

Figure 6:
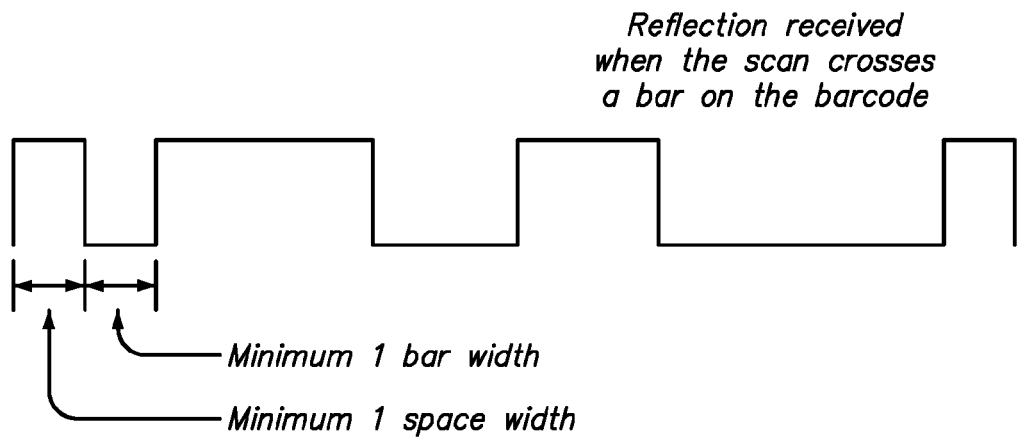
FIG. 6 illustrates a waveform of a signal for simulating reflection of a scanning beam being moved across a static visual image of the barcode in accordance with an embodiment of the present invention.

FIG. 6 illustrates a waveform of a signal for simulating reflection of a scanning beam being moved across a static visual image of the barcode in accordance with an embodiment of the present invention. As shown in FIG. 6, a logic "1" corresponds to a light source (e.g. red LED 254 in FIG. 2) being on, whereas, a logic "0" corresponds to the light source being off.

The waveform of FIG. 6 can be used for communicating barcode information from the bridge device 106 to barcode scanner at a POS terminal. This waveform can also be used for communicating barcode information from a mobile device 104 to a bridge device 106; in this case, the time intervals for each bit can be of longer duration than would be used for communicating the barcode information directly to a barcode scanner.

Figure 7:
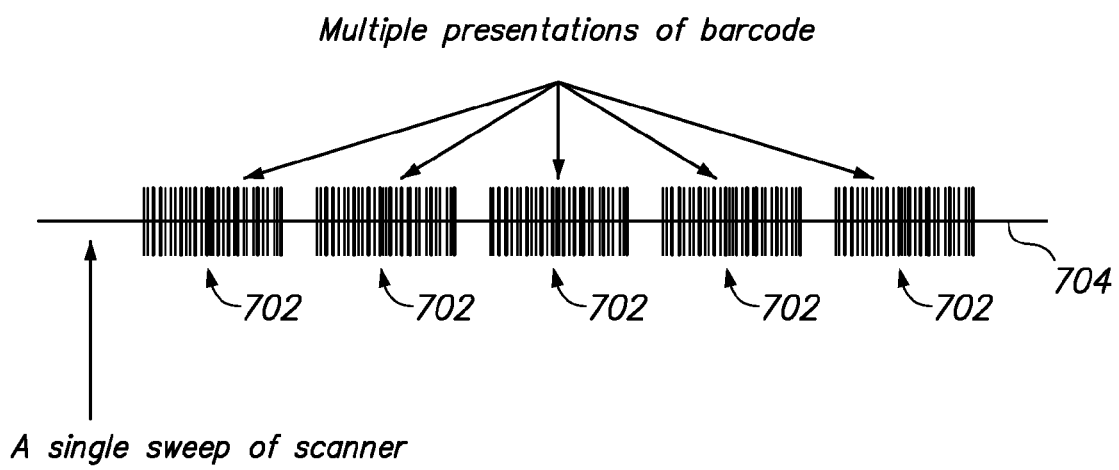
FIG. 7 illustrates signal for simulating reflection of a scanning beam having multiple presentations of a light-simulated barcode in accordance with an embodiment of the present invention.

FIG. 7 illustrates signal for simulating reflection of a scanning beam having multiple presentations of a light-simulated barcode 702 in accordance with an embodiment of the present invention. A horizontal line 704 represents a single sweep of a barcode scanner and the barcode 702 is simulated multiple times during the sweep.

Figure 8:
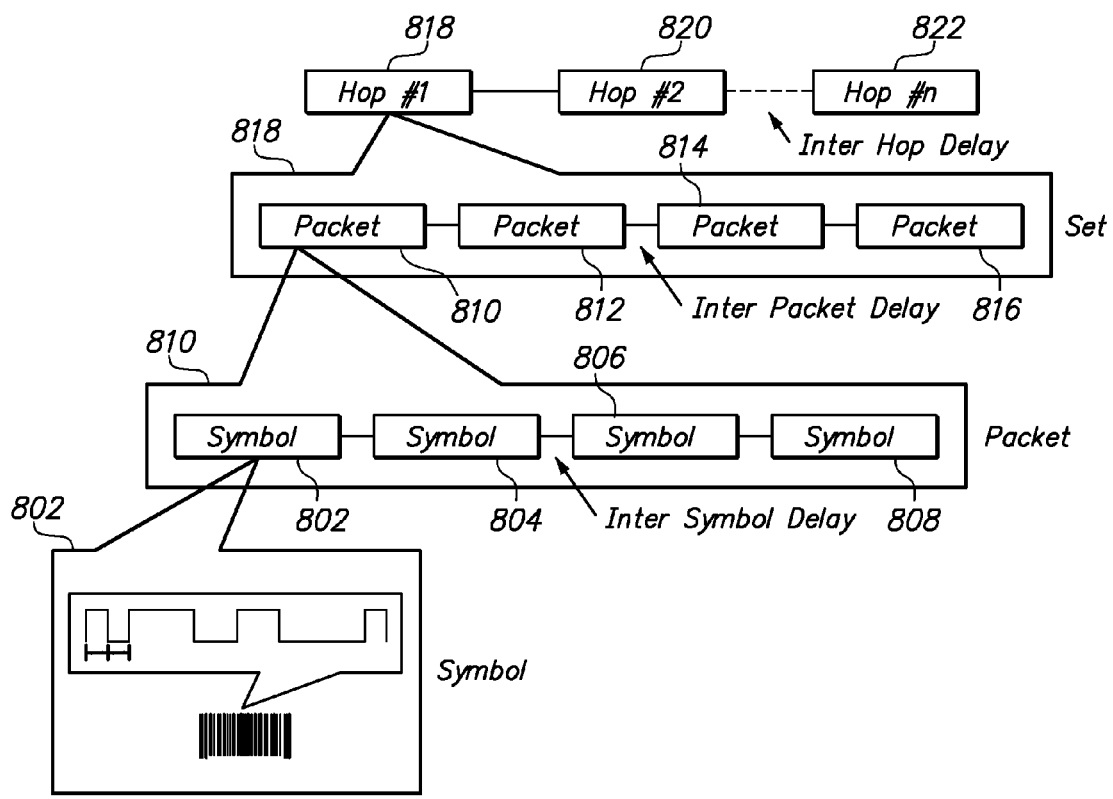
FIG. 8 illustrates an audio signaling communication protocol for communicating barcode information in accordance with an embodiment of the present invention.

FIG. 8 illustrates an audio signaling communication protocol for communicating barcode information in accordance with an embodiment of the present invention. Each "hop" can be defined by the following parameters:

BW=bar width timing (e.g. the "bit" time in 250 ns resolution)
NS=number of symbols to be transmitted in each packet
ISD=inter-symbol delay (e.g. in usec resolution)
NP=number of packets per hop
IPD=interpacket delay (e.g. in 10 usec resolution)
IHD=inter-hop delay (e.g. in 10 usec resolution)

A complement of hops defines a "hop sequence." As shown in FIG. 8, each symbol represents a barcode. Multiple symbols 802, 804, 806, 808 can be included in each packet. Multiple packets 810, 812, 814, 816 can be included in each set of packets where each set is a single "hop." Multiple sets 818, 820, 822 can be generated, where the multiple sets 818, 820, 822 are collectively a "hop sequence." Each of the parameters can changes from one set to the next in hop sequence so that a hop sequence can be given as:

$$BW1, NS1, IDS1, NP1, IHD1 \Rightarrow \text{Hop \#1}$$
$$BW2, NS2, IDS2, NP2, IHD2 \Rightarrow \text{Hop \#2}$$
$$...$$
$$BWn, NSn, IDSn, NPn, IHDn \Rightarrow \text{Hop \#n}$$

Thus, two distinct sets of date are needed to complete a hop sequence: (1) hop sequence table; and (2) symbol data table. The hop sequence table can be an array of data structures containing the data described above. The symbol data table can be a block of bytes containing symbol information represented by a ones and zeros pattern. Contents of the hop sequence table is used to establish corresponding intervals represented by these zeros and ones for each hop in the hop sequence. The size of the symbol data table may be large enough that it is impractical to transfer this data in a single packet from the mobile device 104. Therefore, a segmented file transfer approach may be used with an acknowledgement sent upon receipt of each packet of file transfer data.

FIG. 9A-B illustrate a table 900 of message types for an audio signaling communication protocol in accordance with an embodiment of the present invention. Each message type is represented by a row in the table 900. A first column of the table 900 indicates the message name. A second column in the table 900 indicates whether the message is for communication from the mobile device 104 to the bridge device 106, from the bridge device 106 to the mobile device 104, or both. A third column of the table 900 provides a functional description of each message type.

Figure 10:
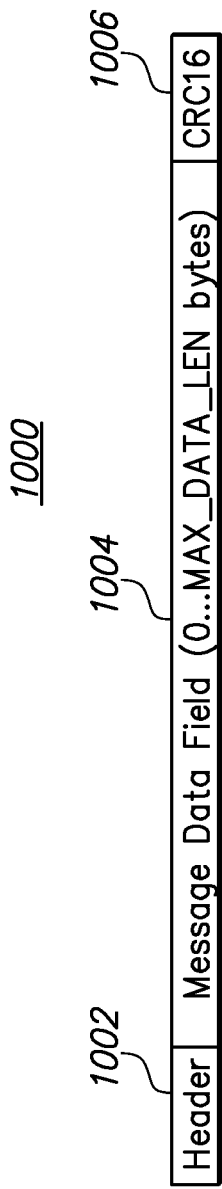
FIG. 10 illustrates a message format for an audio signaling communication protocol in accordance with an embodiment of the present invention.
Figure 11:
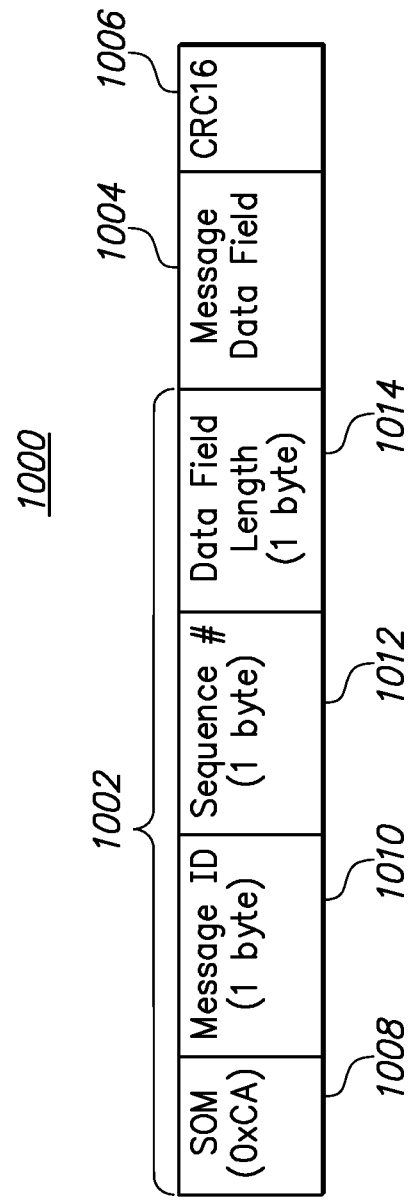
FIG. 11 illustrates a message header format for an audio signaling communication protocol in accordance with an embodiment of the present invention.

FIG. 10 illustrates a format of a message 1000 for an audio signaling communication protocol in accordance with an embodiment of the present invention. As shown in FIG. 10, the message 1000 includes a header 1002, a message data field 1004 and a cyclic redundancy check (CRC) field. FIG. 11 illustrates the message 1000 with additional details of the header 1002 format in accordance with an embodiment of the present invention. As shown in FIG. 11, the header 1002 includes a start of message (SOM) field 1008, a message identification (ID) field 1010, a sequence number field 1012 and a data field length field 1014. The message data field 1004 may be absent in some types of messages, but otherwise supplies data unique to a particular message type. The CRC field provides for error detection for messages. Within the header 1002, the SOM field 1908 is used to identify the start of each message. The message identification field 1010 is used to identify the type of a particular message. The sequence number field 1012 is used to indicate where in a sequence a particular message belongs, for example, if the messages are received out of order due to retransmission of one or more messages. The data field length field 1014 is used to indicate the length of the data field 1004 for a particular message.

FIG. 12A-C illustrate a table 1200 of message data formatting for an audio signaling communication protocol in accordance with an embodiment of the present invention. Each message ID is represented by a row in the table 1200. A first column of the table 1200 indicates the message ID. A second column in the table 1200 indicates a format of the data field 1004. A third column of the table 1200 provides a functional description of each message ID.

In addition to message formatting as described herein, time-outs can also be associated with the communication protocol so that the mobile device 104 and bridge device 106 know how much time is expected to elapse between transmissions, retries and acknowledgements. Because transmission is preferably half-duplex, all messages transmitted by device can be transmitted in their entirety, then the transmitting device can stop transmitting (e.g. stop audio generating) and listen for an expected response from the receiving device indicating that the message was received. Otherwise, the sender can retransmit the message again.

Additional rules for transmitting and receiving messages can include the following. The bridge device 106 sends a first status message (e.g. BBID_STATUS) after it is first powered up or otherwise reset. The bridge device 106 may repeat sending the status message every 100 msec until it receives a first message from the mobile device 104. The bridge device 106 may only listed for messages when it is not transmitting and when it is not controlling an outgoing light simulated bar code. Accordingly, the mobile device 104 should respond to status messages shortly after receipt in order to avoid sending a response while the bridge device 106 is not listening because it is transmitting. The mobile device 104 should not transmit until it has received the status message (BBID_STATUS) from the bridge device 106. A response timer should be started when sending any messages so as to resend the message when the timer times out. Upon receipt of a complete byte, the bridge device 106 can set a receive timeout timer (e.g. RTT). The receive timeout timer times out, this indicates a corrupt message; in this case, a corrupt message flag can be sent and the receiving bridge device 106 can wait until detecting an inter-message delay time, at which point the receiving bridge device 106 is can begin receiving a retry, or the bridge device 106 can immediately send a NAK message (e.g. a BBID_ACK set to NAK) to initiate a retry.

A sequence for communicating a barcode can be as follows. The user starts the application 102 (FIG. 1). The application 102 initializes, then the mobile device 104 waits until it detects a complete transmission of the status message (e.g. BBID_STATUS) from the bridge device 106. The mobile device 104 begins sending the hop sequence table to the bridge device 106. The bridge device 106 responds with an ACK message (e.g. BBID_ACK set to ACK). The mobile device 104 transmits one or more symbol table records (e.g. BBID_SYMBOL_TBL) to the bridge device 106 which then stores at least the data portion of these records in its memory. The bridge device 106 responds with an ACK message (e.g. BBID_ACK set to ACK). The mobile device 104 transmits a "start beaming" message to the bridge device. The bridge device 106 responds with an ACK message (e.g. BBID_ACK set to ACK). The bridge device 106 references the hop sequence table for each record stored in this table and performs a complete sweep (hop sequence) at the bar width specified for each hop. After completion of "beaming" the entire hop sequence, the bridge device 106 begins transmitting the status message (e.g. the BBID_STATUS message) every 100 msec again.

Figure 13:
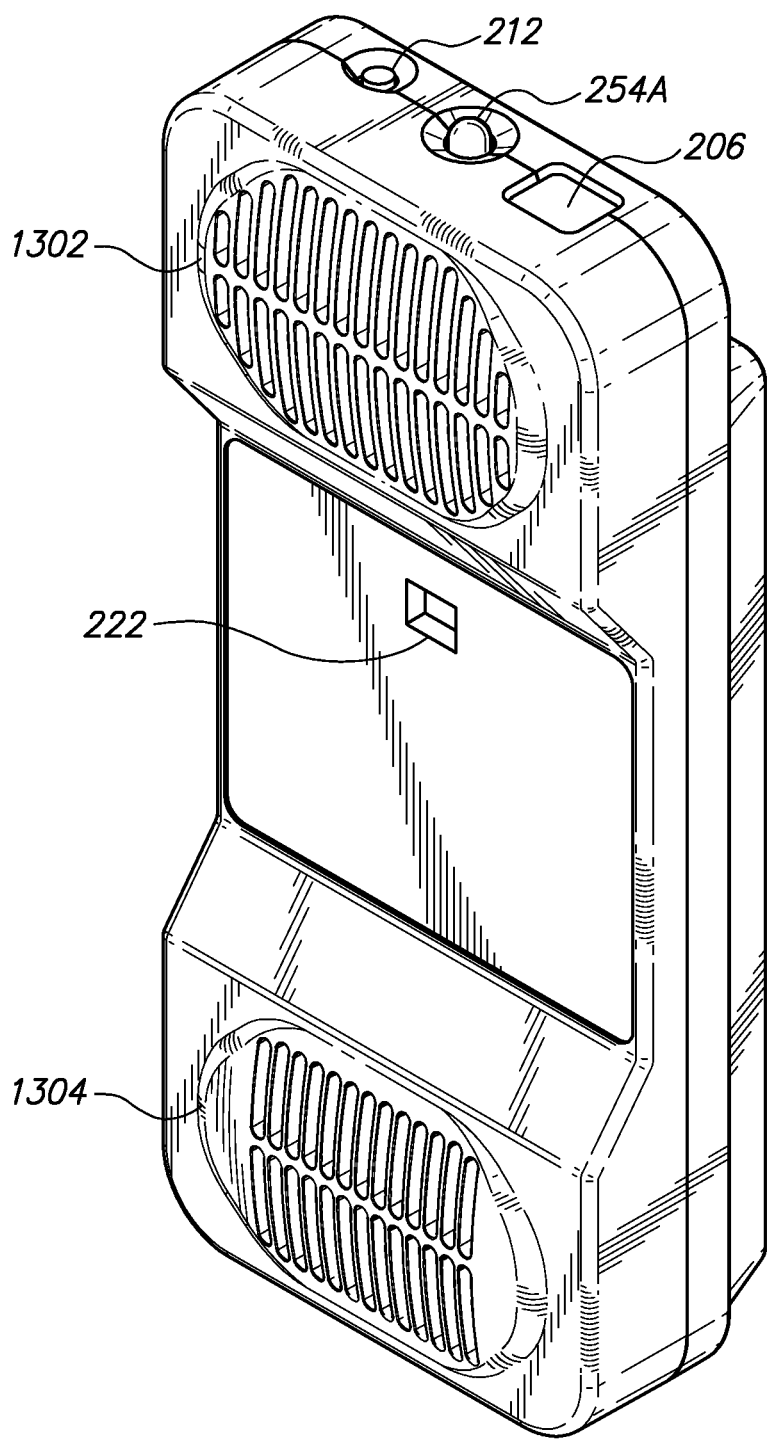
FIG. 13 is a perspective view of an electronic device housing in accordance with an embodiment of the present invention.
Figure 14:
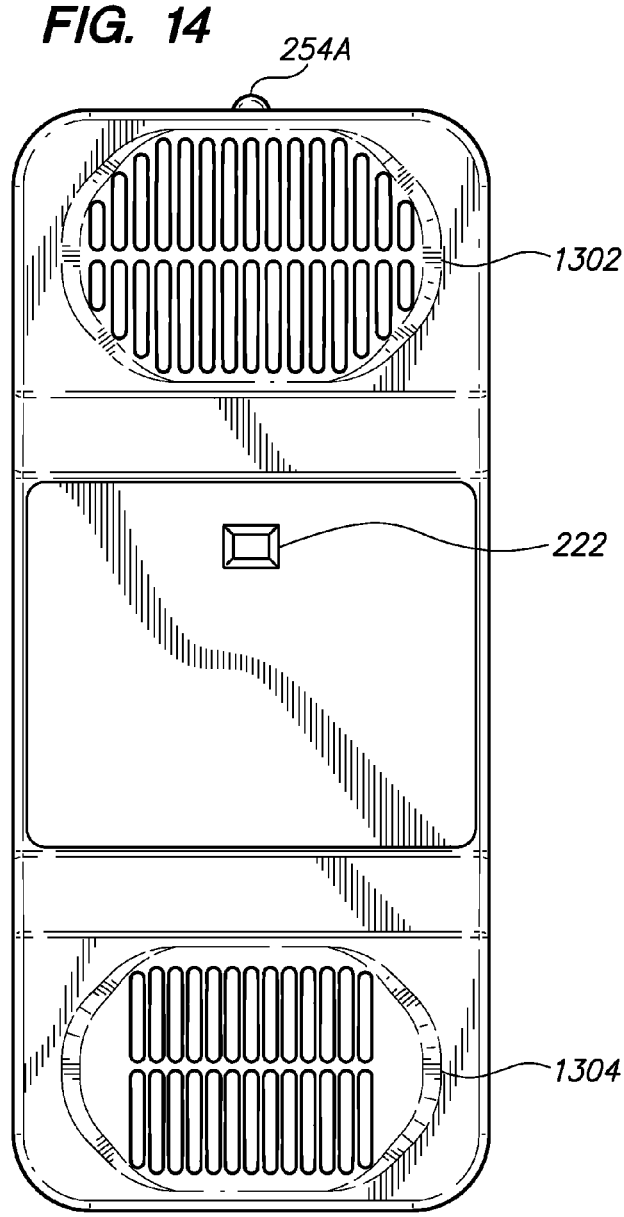
FIG. 14 is a front view of the electronic device housing in accordance with an embodiment of the present invention.
Figure 15:
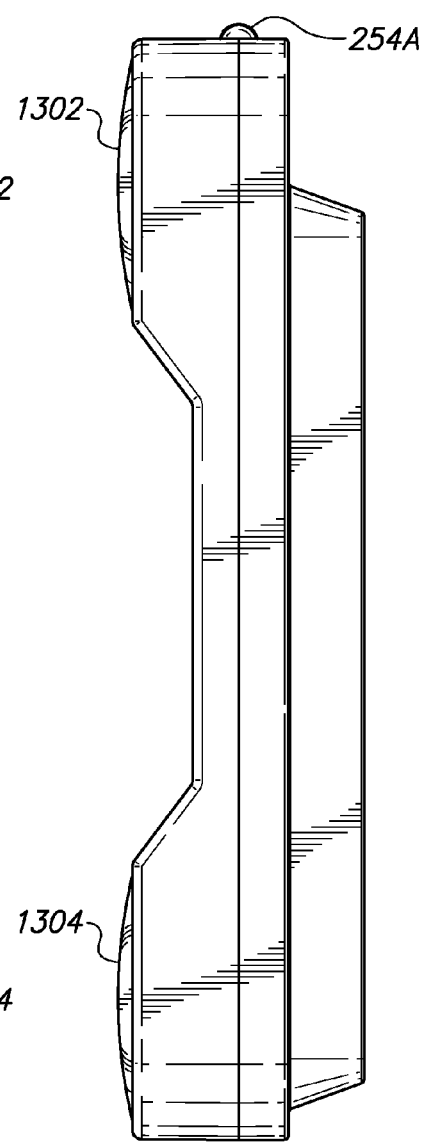
FIG. 15 is a side elevation view of the electronic device housing in accordance with an embodiment of the present invention.
Figure 16:
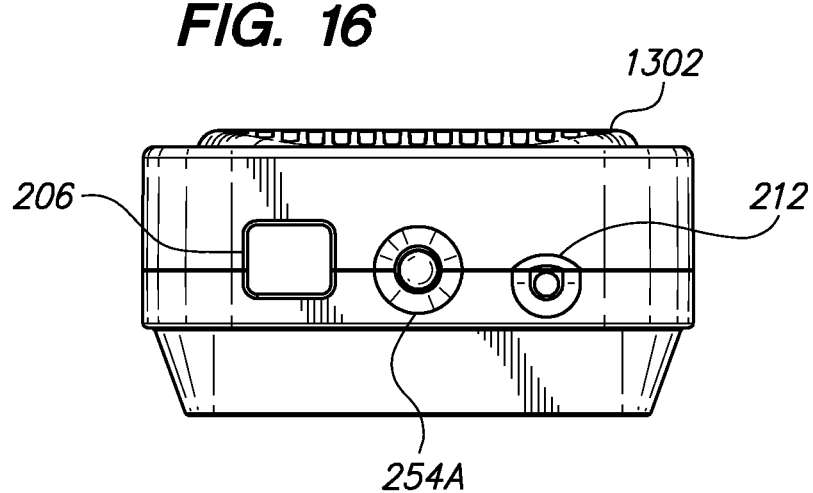
FIG. 16 is a top elevation view of the electronic device housing in accordance with an embodiment of the present invention.
Figure 17:
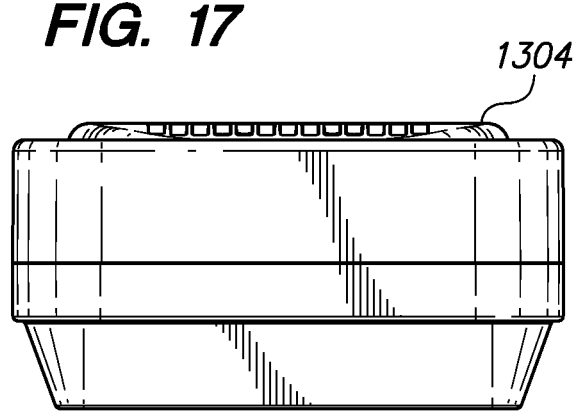
FIG. 17 is a bottom elevation view of the electronic device housing in accordance with an embodiment of the present invention.

FIGS. 13-18 illustrate an electronic device housing 1300 in accordance with embodiments of the present invention. More particularly, FIG. 13 is a perspective view of the electronic device housing 1300; FIG. 14 is a top view of the electronic device housing 1300; FIG. 15 is a right side elevation view of the electronic device housing 1300 (the left side can be a mirror image of the right side); FIG. 16 is a front elevation view of the electronic device housing 1300; FIG. 17 is a rear elevation view of the electronic device housing 1300; and FIG. 18 is a bottom view of the electronic device housing 1300. FIGS. 13-18 show the connector 206 (FIG. 2), which can be a micro-USB (universal serial bus) connector. In addition, the switch 212 (FIG. 2) that can be used to turn the device on and off or to reset the device is shown. The proximity sensor 222 (FIG. 2) that can be used to detect the presence of a mobile device is also shown. The LEDs that can provide both status information and the barcode scanner signaling/simulation are shown in FIGS. 13-18 as LED 254A and 254B. In this embodiment, the LEDs 254A and 254B are each preferably multi-color red/green LEDs. Also, the LEDs 254A and 254B are preferably positioned on different sides of the housing. Specifically, as shown in FIGS. 13-16, the LED 254A can be positioned at the front end of the housing 1300. And, as shown in FIG. 18, the LED 254B can be positioned at the bottom of the housing 1300. In operation, the housing 1300 can be positioned with its bottom resting on a surface at a POS. For this purpose, rubber feet (not shown) can be provided on the bottom of the housing 1300. The housing can be positioned at the POS location and oriented so that the front located LED 254A can be conveniently scanned by a handheld barcode scanner. In this way, pulsed light that simulates a barcode can be received from the LED 254A by the handheld barcode scanner. Alternatively or additionally, the housing 1300 can be positioned on top of an in-counter barcode scanner so that pulsed light from the bottom located LED 254B can be received directly by the barcode scanner.

As shown in FIGS. 13-17, the housing can be provided with grills 1302 and 1304. The microphone 226 (FIG. 2) and speaker 252 (FIG. 2), can communicate audio information via the grills 1302 and 1304. More particularly, the microphone 226 can be positioned behind the grill 1302 and the speaker 226 can be positioned behind the grill 1304.

FIG. 18 shows a dual in-line package (DIP) switch 1306. In an embodiment, the switch 1306 can have four sub-switches having the following functions:
SW #1: OFF position is for shipping—keeps unit from accidentally turning on during shipment. Off position is also used to provide visual charging feedback status on the LEDs. ON position is for enabling operation of unit.
SW #2: OFF position is for normal "fixed" installation operation. ON position is for "mobile" installations where unit needs to power off after each transaction completes. The power button must be pressed prior to initiation of a transaction.
SW #3: OFF position turns bottom firing red/green LED 254B off. ON position enables the bottom firing red/green LED 254B (this switch should be off if SW #4 is on).
SW #4: OFF position turns front firing red/green LED 254A off. ON position enables the front located firing red/green LED 254A (this switch should be off if SW #3 is on).
It will be apparent that the switch 1306 can be appropriately coupled to components of the bridge device 106 illustrated in FIG. 2 so as to perform the functions described above.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:
1. A method of communicating barcode information using audio signaling comprising steps of:

detecting a mobile device being brought into physical proximity to a communication bridge device, the bridge device being in a fixed location relative to the mobile device;
commencing two-way audio communication between the mobile device and the bridge device upon detection of the mobile device by the bridge device;
receiving barcode information at the bridge device, the barcode information being received from the mobile device, comprising: receiving a hop sequence table at the bridge device, the hop sequence table being received from the mobile device;
responding to the hop sequence table by the bridge device sending an acknowledgment message to the mobile device; and receiving one or more symbol table records at the bridge device, the one or more symbol table records being received from the mobile device and the bridge device storing at least the data portion of the symbol table records in memory;
converting the barcode information into a pulsed signal to simulate scanning of a static image of a barcode;
providing a human perceptible signal that indicates the barcode information has been received into the bridge device; and
transmitting the barcode information as light pulses emitted from the bridge device for reception by a barcode scanner.

2. The method according to claim 1, further comprising receiving the barcode information into the mobile device and storing the barcode information therein.

3. The method according to claim 2, further comprising a user selecting the barcode information from among a plurality of barcode information stored in the mobile device.

4. The method according to claim 2, further comprising bringing the mobile device into proximity of the bridge device.

5. The method according to claim 1, wherein the mobile device comprises a smart phone and further comprising configuring the smart phone to execute an application program, wherein the application program causes the smart phone device to participate in said two-way audio communication between the mobile device and the bridge device using a microphone and speaker of the smart phone and to communicate the barcode information from the mobile device to the bridge device.

6. The method according to claim 1 wherein the two-way audio communication is half-duplex.

7. The method according to claim 1, wherein said communicating barcode information from the mobile device to the bridge device further comprises the bridge device responding to the symbol table records with an acknowledgment message.

8. The method according to claim 7, wherein said communicating barcode information from the mobile device to the bridge device further comprising the mobile device transmitting a start beaming message to the bridge device.

9. The method according to claim 8, wherein said communicating barcode information from the mobile device to the bridge device further comprising the bridge device responding to the start beaming message with an acknowledgment message.

10. The method according to claim 8, wherein said communicating barcode information from the mobile device to the bridge device further comprising the bridge device responding to the start beaming message by using the hop sequence table for performing a hop sequence.

11. The method according to claim 10, wherein said communicating barcode information from the mobile device to the bridge device further comprising the bridge device periodically transmitting a status message.

12. A method of communicating barcode information using audio signaling comprising steps of:
  detecting a mobile device being brought into physical proximity to a communication bridge device, the bridge device being in a fixed location relative to the mobile device;
  commencing two-way audio communication between the mobile device and the bridge device in response to detection of the mobile device by the bridge device, the audio communication being via sound waves and including barcode information from the mobile device being received at the bridge device, wherein the bridge device initiates communication with the mobile device by emitting an audio tone or sequence of audio tones;
  converting the barcode information received at the bridge device into a pulsed signal to simulate scanning of a static image of a barcode;
  providing a human perceptible signal that indicates the barcode information has been received into the bridge device; and
  transmitting the barcode information as light pulses emitted from the bridge device for reception by a barcode scanner.

13. The method according to claim 12, further comprising receiving the barcode information into the mobile device and storing the barcode information therein.

14. The method according to claim 13, further comprising a user selecting the barcode information from among a plurality of barcode information stored in the mobile device.

15. The method according to claim 13, further comprising bringing the mobile device into proximity of the bridge device.

16. The method according to claim 12, wherein the mobile device comprises a smart phone and further comprising configuring the smart phone to execute an application program, wherein the application program causes the smart phone device to participate in said two-way audio communication between the mobile device and the bridge device using a microphone and speaker of the smart phone and to communicate the barcode information from the mobile device to the bridge device.

17. The method according to claim 12, wherein the two-way audio communication is half-duplex.

18. The method according to claim 12, wherein the audio communication comprises a hop sequence table from the mobile device being received at the bridge device.

19. The method according to claim 18, wherein the audio communication further comprises the bridge device responding to the hop sequence table with an acknowledgment message.

20. A method of communicating barcode information using audio signaling comprising steps of:
  detecting a mobile device being brought into physical proximity to a communication bridge device, the bridge device being in a fixed location relative to the mobile device;
  commencing two-way audio communication between the mobile device and the bridge device in response to detection of the mobile device by the bridge device, the audio communication being via sound waves and including barcode information from the mobile device being received at the bridge device, wherein the audio communication comprises: a hop sequence table from the mobile device being received at the bridge device; the bridge device responding to the hop sequence table with an acknowledgment message; and one or more symbol table records from the bridge device being received at the bridge device and the bridge device storing at least the data portion of the symbol table records in memory;
  converting the barcode information received at the bridge device into a pulsed signal to simulate scanning of a static image of a barcode;
  providing a human perceptible signal that indicates the barcode information has been received into the bridge device; and
  transmitting the barcode information as light pulses emitted from the bridge device for reception by a barcode scanner.

21. The method according to claim 20, wherein the audio communication further comprises the bridge device responding to the symbol table records with an acknowledgment message.

22. The method according to claim 21, wherein the audio communication further comprises a start beaming message from the mobile device being received at the bridge device.

23. The method according to claim 22, wherein the audio communication further comprises the bridge device responding to the start beaming message with an acknowledgment message.

24. The method according to claim 23, wherein the audio communication further comprises the bridge device responding to the start beaming message by using the hop sequence table for performing a hop sequence.

25. The method according to claim 24, wherein the audio communication further comprises the bridge device periodically transmitting a status message.

26. The method according to claim 12, wherein the bridge device employs a proximity detector selected from the group consisting of an infra-red (IR) proximity sensor, ultrasonic proximity detector, capacitive proximity sensor, imaging sensor, light sensor, and opto-interrupter.

27. The method according to claim 12, wherein the bridge device employs a microphone for receiving the sound waves of the audio communication.

28. A method of communicating barcode information using audio signaling comprising steps of:
  detecting a mobile device being brought into physical proximity to a communication bridge device, the bridge device being in a fixed location relative to the mobile device;
  commencing two-way audio communication between the mobile device and the bridge device in response to detection of the mobile device by the bridge device, the audio communication being via sound waves and including barcode information from the mobile device being received at the bridge device wherein two-way audio communication is performed using frequency-shift keying (FSK) having at least two different audio tones for representing binary values;
  converting the barcode information received at the bridge device into a pulsed signal to simulate scanning of a static image of a barcode;
  providing a human perceptible signal that indicates the barcode information has been received into the bridge device; and
  transmitting the barcode information as light pulses emitted from the bridge device for reception by a barcode scanner.

29. The method according to claim 12, wherein mobile device detects the audio tone or sequence of audio tones emitted by the bridge device and responds by emitting an audio tone or sequence of audio tones.

30. The method according to claim 12, wherein the barcode information represents multiple barcodes.

* * * * *